E. SCHREIER AND R. JENNY.
AUTOMATIC MACHINE FOR THE MANUFACTURE OF SCREWS AND OTHER PIECEWORK.
APPLICATION FILED AUG. 20, 1920.
1,412,140.
Patented Apr. 11, 1922.
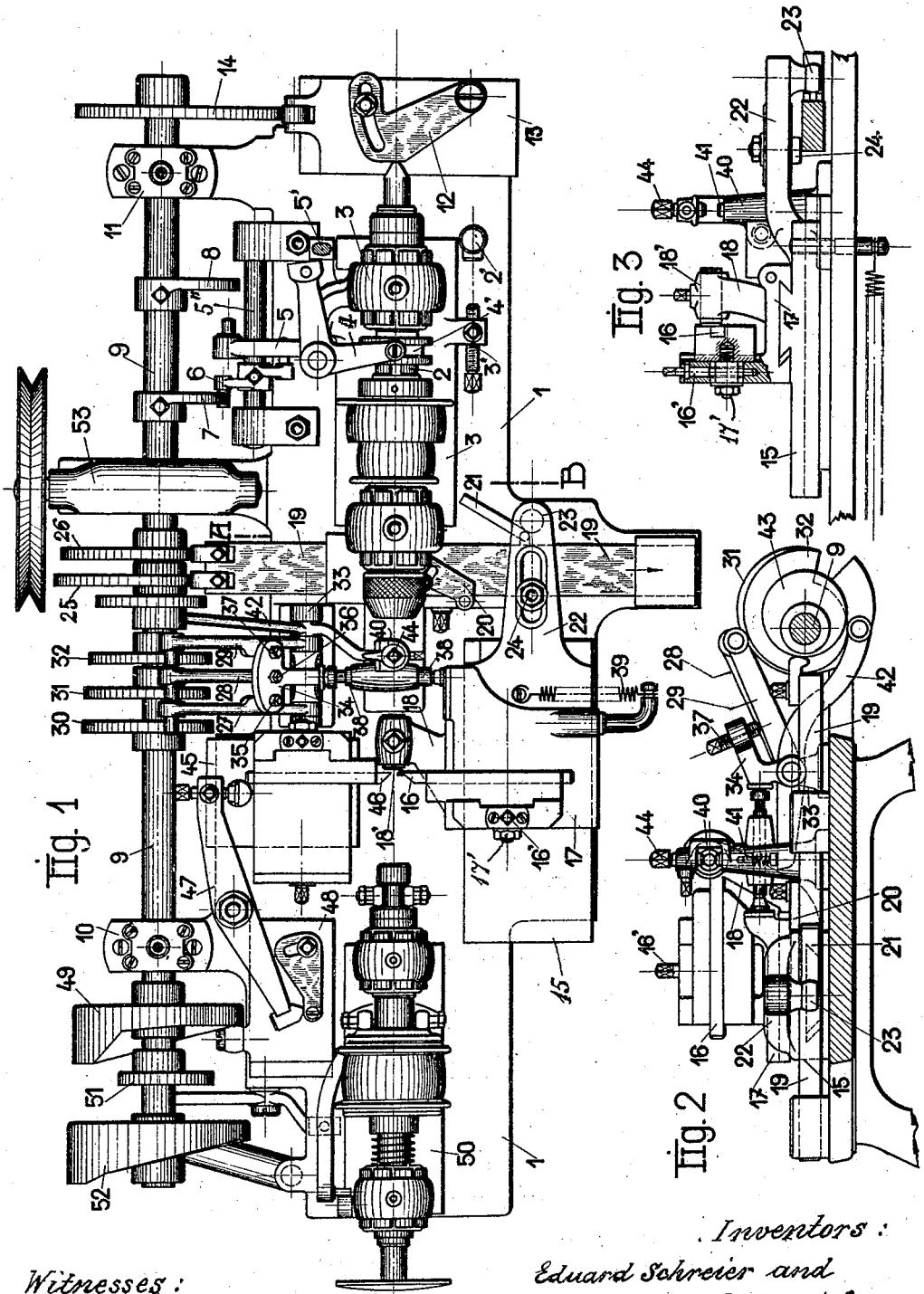
Witnesses:
E. Alder
M. Fraix
Inventors:
Eduard Schreier and
Richard Jenny
by C. Lewis
their attorney.

UNITED STATES PATENT OFFICE.

EDUARD SCHREIER AND RICHARD JENNY, OF ZUCHWIL, SWITZERLAND.

AUTOMATIC MACHINE FOR THE MANUFACTURE OF SCREWS AND OTHER PIECEWORK.

1,412,140. Specification of Letters Patent. Patented Apr. 11, 1922.

Application filed August 20, 1920. Serial No. 404,881.

*To all whom it may concern:*

Be it known that we, EDUARD SCHREIER and RICHARD JENNY, both citizens of the Republic of Switzerland, and residents of Zuchwil, in the Canton of Solothurn, Switzerland, have invented an Improved Automatic Machine for the Manufacture of Screws and other Piecework, of which the following is a specification.

In most of the known automatic machines of this kind the wire-guide or support for the wire to be worked and fashioned into screws is mounted stationary upon the bed-plate of the machine, and the feeding of the wire during the working period of the cutting tool is effected by means of the adjustable head-stock. Such arrangement, in which the wire-guide is in a fixed position, is disadvantageous to the whole action of the automatic machine inasmuch as in most cases only one of the several cutting tools can be employed at one and the same time so that during the rough-turning, for instance, it is impossible simultaneously to cut the screw-threads. The consequence is a great loss of time.

Our invention has for its object to avoid these drawbacks, the chief improvement being the mounting of the wire-guide on the slide carrying the cutting tool in such a manner that the said wire-guide, during the working period of the rough-turning tool, is caused to be moved thereby enabling a simultaneous fashioning of the screw-threads by means of an automatically operated screw-thread cutting apparatus.

A desirable form in which this invention may be embodied is shown in the accompanying drawing, wherein:

Fig. 1 shows a plan view of the automatic machine;

Fig. 2 shows an end elevation, partly in section through line A—B in Fig. 1, of the machine illustrating in particular the arrangement of the cutting tool and the wire-guide, and Fig. 3 shows another side view, partly in section, of the cutting tool and parts for mounting the same.

Slidably mounted upon a bedplate 1 and serving to carry a spindle, the main spindle 2, is the head-stock 3. The wire to be worked and fashioned into screws extends right through the spindle 2 and is adapted to be held therein by means of clamping device subsequently described, the purpose thereof being to secure the wire during the screw-cutting or other fashioning operation. The wire is also adapted to be firmly gripped in the main spindle 2 by means of a tongs'-ring 4' slidably mounted on said main spindle and, when moved in either direction, such tongs'-ring is caused to act on clutch members which grip the wire and are of the type commonly used in devices of this kind. The sliding movement of the tongs'-ring 4' is made possible by a bell-crank lever 4 one arm thereof engaging the said ring 4' and the other arm being under the control of a pivotally mounted rod as indicated at 5'. A second lever 5, pivoted at 5" and under the control of a third and double-armed lever 6 also pivoted at 5", is adapted to act on the rod 5' in such a manner that the latter is caused to impart a swinging movement to the bell-crank lever 4 and consequently a sliding movement to the tongs'-ring 4'. The engaging parts of the rod 5' and the lever 5 are not shown, nor are those of the said rod and the corresponding arm of the bell-crank lever. These parts may be formed in any suitable manner. The levers 5 and 6 are in turn moved through the action of cams 7 and 8. Parallel to the main spindle 2 is a shaft 9 journaled in bearings 10 and 11 and carrying the said cams and the several other cams of which the purpose is hereinafter described.

The adjustment of the head-stock 3 is adapted to be brought about by means of an angle-plate 12 which may be made to move laterally to the axis of the spindle and is pivoted to and adjustably mounted on a slide 13. The latter is actuated by a cam 14 secured at the corresponding end of the shaft 9.

The front portion of the bedplate is designed to support a sliding-rest 15 carrying the cross-slide 17 which in turn carries the cutting tool 16. A wire-guide 18 of the form more clearly shown in Fig. 3 is made integral with the slide-rest 15 and thus caused to move accordingly when the slide-rest is moved in a longitudinal direction. The bore of the wire-guide is concentric with the main spindle 2, and the said wire-guide is moreover so disposed that one of its faces is adjacent to the turning or cutting tool and thus serves also as a support for the wire to be worked.

The axial adjustment of the slide-rest 15 and the wire-guide 18 respectively is effected by means of a flat bar 19 adapted to slide laterally of the axis of the main spindle. This bar is provided with arms 20 and 21 disposed at an angle to its sides and pivoted thereto in such a way that the angle may be adjusted according to desire. An extension 22 of the slide-rest and forming an integral part of the same has mounted at its outer end a roller 23 adapted to roll upon the arm 21, as soon as the bar slides in the direction of the arrow, thereby moving the slide-rest with the parts mounted on it. The arm 20 arranged to be adjusted on the bar 19 has for its purpose to cause, at a given moment, a quicker movement of the slide-rest which takes place only when the said arm is adjusted to a greater angle in relation to the bar than the arm 21. This quicker movement is taken up by a roller 24 adjustably mounted centrally of the extension 22. Cams 25 and 26 fixed on the shaft 9 effect the sliding movement of the said bar and the actuation of the arms 20 and 21.

The forward and rearward movement of the cross-slide 17 with cutting tool, and the putting of the latter in operation is caused by gearing arranged at the back portion of the bedplate. This gearing comprises levers 27, 28 and 29 of which one end rests on cams 30, 31 and 32 respectively, while the other end of each of these levers is journaled in a bearing 33. An angle-shaped member 34, also journaled in the bearing 33, is fitted with set-screws 35, 36 and 37 each of which is resting on the corresponding of the three levers.

In the body of the wire clamping device a spring-controlled pin 38 is so mounted that it receives the impact of the member 34 transmitted to the same by the aforesaid cams 30, 31, and 32 and the levers, thus imparting a corresponding movement to the slide 17 and consequently moving the cutting tool away from the working piece. The returning of the slide 17 and cutting tool to its working position is caused by a spring mounted at 39.

The desired fashioning of the working piece is obtained by the aid of the set-screws 35, 36 and 37 which are accordingly adjusted once the proper form of the cams has been selected. The cutting tool may also be adjusted in relation to the axis of rotation, such adjustment being effected by an adjusting screw 16' secured and locked by a nut 17'.

If, for instance, a working piece has been finished the wire again to be worked needs to be advanced by a length corresponding with that of the working piece, the means for such advancement consisting of the aforesaid clamping device which is mounted upon the bedplate 1 between the head-stock 3 and the cutting tool 16. The distance of the backwardly sliding movement of the head-stock is capable of being adjusted and limited by a screw arranged at 3' on said head-stock and a stopper fixed at 2'.

The wire clamping device comprises the body 40 hereinbefore mentioned and constructed in the form clearly shown in Figs. 2 and 3. The lower part of this body contains a spring-controlled pin 41 of which the upper end tends to press against the wire to be worked, while the bottom of this pin rests on one end of a lever 42. Its pivot is mounted in the bearing 33 and movement to this lever is imparted by a cam 43 secured on the shaft 9. Any upwardly directed pressure by the pin 41 is taken up by a set-screw 44 fitted in the top part of the body 40, the wire to be worked therefore being tightened by the pin 41 and the set-screw 44. By adjusting the latter the degree of tightening can of course be regulated.

Mounted upon the bedplate 1, opposite the slide-rest 15, is a slide 45 which is devised to move laterally of the main spindle and carries a cutting-off tool 46 cutting the finished article from the wire. The slide 45 receives its movement from a lever 47 pivoted to the bedplate 1 which lever itself is adapted to be actuated by means of another slide 48 and a bevelled-off member adjustably arranged on said slide 48. A cam 49 fixed on the shaft 9 effects the movement of the slide 48 in an axial direction. Opposite the head-stock and the main spindle 2 and in the same axis of rotation is a screw-cutting apparatus 50 of the usual and known construction, and mounted at the corresponding end of the shaft 9 are cams 51 and 52 which constitute the means for operating the said screw-cutting apparatus. The screw-cutting takes place when the main spindle is rotating at full speed, the speed of the screw-cutting apparatus in that case necessarily being greater still until the screw-threads have been cut. Subsequent to that event the screw-cutting apparatus is automatically brought to a stop and the screw-cutting tool fitted on the apparatus is consequently caused to unscrew itself from the working piece in order to automatically assume its initial position. A wheel and worm-gearing 53 is provided to put the shaft 9 in rotation.

According to the construction described it is possible, during the cutting of the screw-threads in a working piece, simultaneously to operate upon a second working piece which constitutes a great advantage in the manufacture of screws and other articles. Moreover, the machine described is adapted to be served with ease.

Having now fully described our said invention what we claim and desire to secure by Letters Patent is:—

1. In an automatic machine for the manufacture of screws and the like articles from wires, the combination, with the machine bedplate and a head-stock mounted thereon, of a main spindle journaled in said head-stock and having a bore for the reception of the wire, a slide arranged at each side of the main spindle and carrying a cutting and turning tool respectively, a wire-guide formed integral with the slide carrying the turning tool, means to move the latter slide in an axial direction during the action of the turning tool, a screw-cutting apparatus mounted opposite and axially of the main spindle, and means for automatically operating the said screw-cutting apparatus, all substantially as set forth.

2. In the herein-described automatic machine for the manufacture of screws and the like mass articles, the combination, with the main spindle mounted on the machine bedplate and having a bore for the reception of the wire, a slide arranged at each side of the said spindle and carrying a cutting and turning tool respectively, a wire-guide forming an integral part of the slide carrying the turning tool, and means to move the turning tool in and out of working position, the said means comprising a slidable pin mounted transversely of the latter slide, gearing to cause the said pin intermittently to act against such slide, and a spring tending to return the slide and turning tool into working position.

3. In an automatic machine of the type described, the combination, with the main spindle mounted on the machine bedplate and a slide arranged at either side of said spindle and carrying a cutting and turning tool respectively, of a wire-guide forming an integral part of the slide carrying the turning tool, and means to move the latter slide and the wire-guide in an axial direction, the said means comprising a flat bar slidably and transversely mounted of the main spindle on the bedplate, gearing to cause the sliding of the said bar transversely of the spindle and the slides, and means to transmit this movement to the slide carrying the turning tool.

In testimony whereof we have hereunto set our hand in the presence of two subscribing witnesses.

SCHREIER, EDUARD.
JENNY, RICHARD.

Witnesses:
W. KOPPELER,
J. H. LAD.